US006747551B1

(12) United States Patent
Smith

(10) Patent No.: US 6,747,551 B1
(45) Date of Patent: Jun. 8, 2004

(54) SCHOOL BUS APPROACHING NOTIFICATION SYSTEM

(76) Inventor: Parnell Smith, 4145 Roaselawn Dr., Indianapois, IN (US) 46226

( * ) Notice: Subject to any disclaimer, the term of this patent is extended or adjusted under 35 U.S.C. 154(b) by 45 days.

(21) Appl. No.: 10/200,677

(22) Filed: Jul. 23, 2002

(51) Int. Cl.$^7$ .................................................. B60Q 1/26
(52) U.S. Cl. ........................ 340/433; 340/994; 340/904
(58) Field of Search ................................ 340/433, 904, 340/901, 994, 902; 701/204

(56) References Cited

U.S. PATENT DOCUMENTS 34,773 A * 3/1862 Dombrowski ................ 48/119
4,325,057 A * 4/1982 Bishop ....................... 340/994
4,713,661 A * 12/1987 Boone et al. ............... 340/994
5,144,301 A * 9/1992 Jackson et al. ............. 340/994
5,680,119 A * 10/1997 Magliari et al. ............ 340/904
6,094,149 A * 7/2000 Wilson ....................... 340/904

* cited by examiner

*Primary Examiner*—Jeffery Hofsass
*Assistant Examiner*—Eric Blount

(57) ABSTRACT

A school bus approaching notification system for alerting users of an approaching school bus so that children do not have to stand outside and wait for the school bus. The school bus approaching notification system includes a transmitter assembly being adapted to be mounted in a school bus; and includes a transmitter mounting bracket supporting the transmitter unit and being adapted to be securely fastened in the school bus; and further includes a receiver assembly including a first receiver unit being adapted to be located in a home and also including a second receiver unit being adapted to be located in a passenger vehicle.

5 Claims, 3 Drawing Sheets

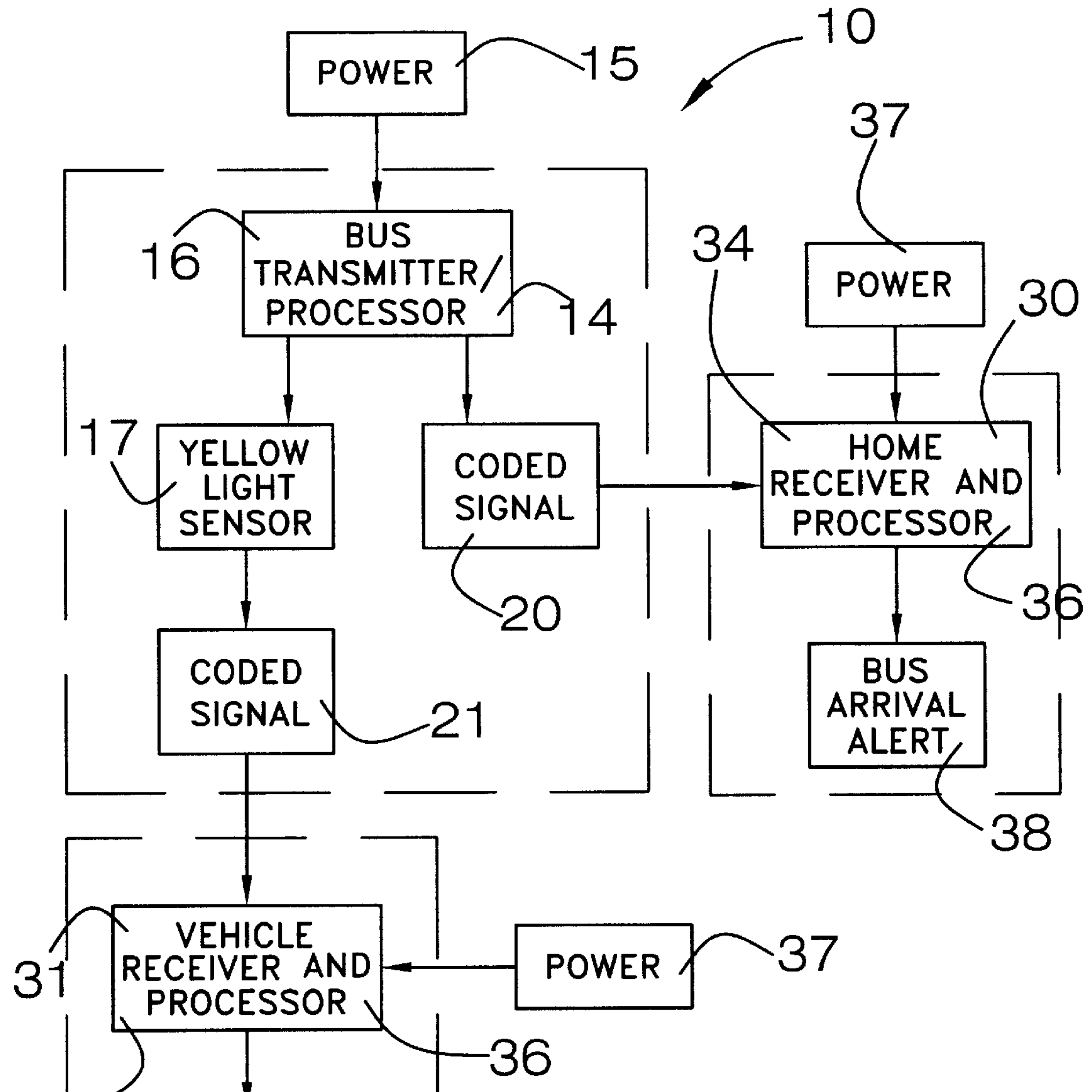
FIG. 2
FIG. 3
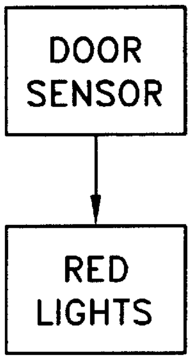

SCHOOL BUS APPROACHING NOTIFICATION SYSTEM

BACKGROUND OF THE INVENTION

1. Field of the Invention

The present invention relates to school bus alerting systems and more particularly pertains to a new school bus approaching notification system for alerting users of an approaching school bus so that children do not have to stand outside and wait for the school bus.

2. Description of the Prior Art

The use of school bus alerting systems is known in the prior art. More specifically, school bus alerting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,094,149; U.S. Pat. No. 4,297,672; U.S. Pat. No. 4,325,057; U.S. Pat. No. 4,350,969; U.S. Pat. No. 5,021,780; and U.S. Pat. No. Des. 242,781.

While these devices fulfill their respective, particular objectives and requirements, the aforementioned patents do not disclose a new school bus approaching notification system. The prior art includes transmitters, receivers, and roadway signs.

SUMMARY OF THE INVENTION

The general purpose of the present invention, which will be described subsequently in greater detail, is to provide a new school bus approaching notification system which has many of the advantages of the school bus alerting systems mentioned heretofore and many novel features that result in a new school bus approaching notification system which is not anticipated, rendered obvious, suggested, or even implied by any of the prior art school bus alerting systems, either alone or in any combination thereof. The present invention includes a transmitter assembly being adapted to be mounted in a school bus; and includes a transmitter mounting bracket supporting the transmitter unit and being adapted to be securely fastened in the school bus; and further includes a receiver assembly including a first receiver unit being adapted to be located in a home and also including a second receiver unit being adapted to be located in a passenger vehicle. None of the prior art includes the combination of the elements of the present invention.

There has thus been outlined, rather broadly, the more important features of the school bus approaching notification system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new school bus approaching notification system which has many of the advantages of the school bus alerting systems mentioned heretofore and many novel features that result in a new school bus approaching notification system which is not anticipated, rendered obvious, suggested, or even implied by any of the prior art school bus alerting systems, either alone or in any combination thereof.

Still another object of the present invention is to provide a new school bus approaching notification system for alerting users of an approaching school bus so that children do not have to stand outside and wait for the school bus.

Still yet another object of the present invention is to provide a new school bus approaching notification system that is easy to set up and use.

Even still another object of the present invention is to provide a new school bus approaching notification system that safeguards the children so that they are not abducted while waiting for the school bus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic diagram of the present invention.

FIG. 3 is another schematic diagram of the present invention.

DESCRIPTION OF THE PREFERRED EMBODIMENT

Figure 1:
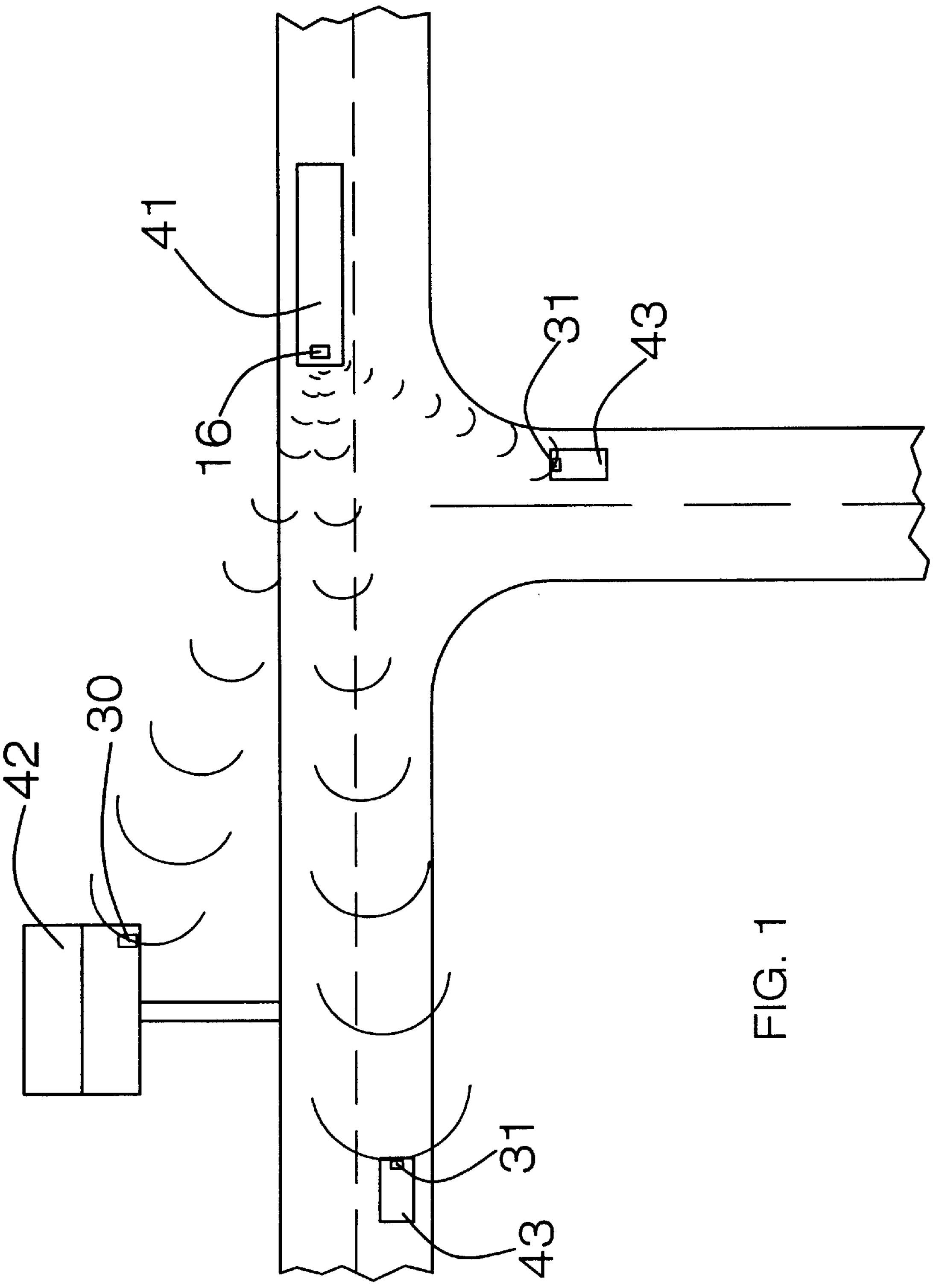
FIG. 1 is a top plan view of a new school bus approaching notification system according to the present invention.
Figure 4:
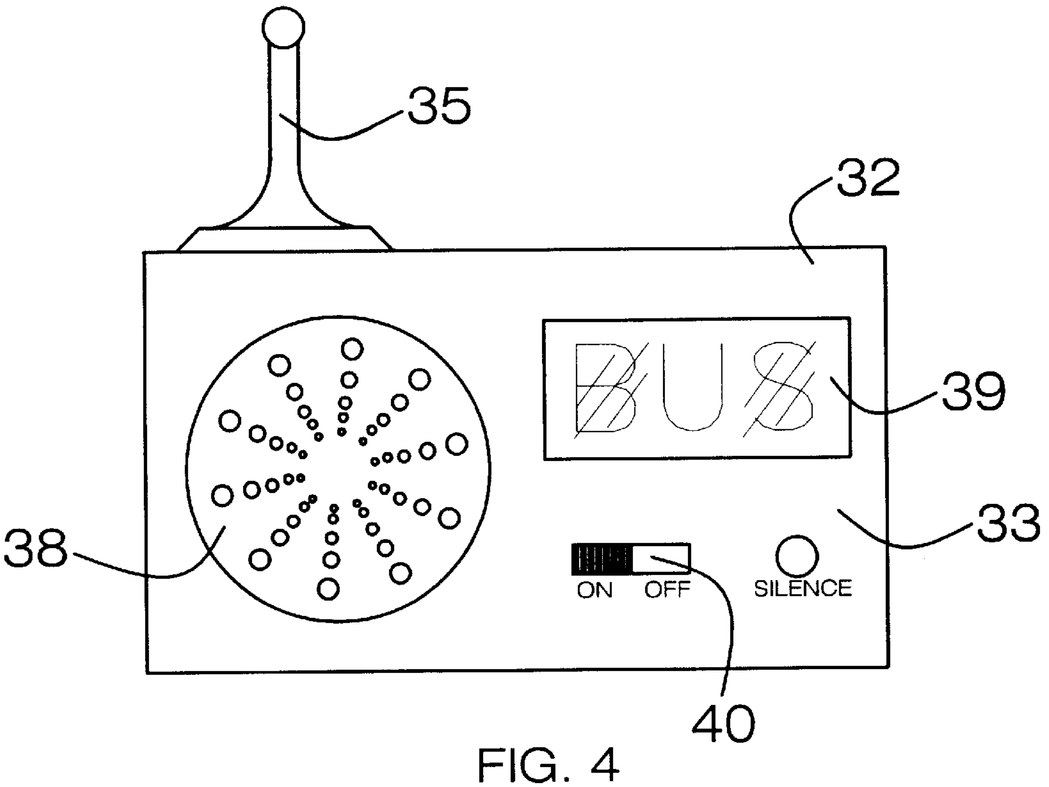
FIG. 4 is a front elevational view of the receiver assembly of the present invention.
Figure 5:
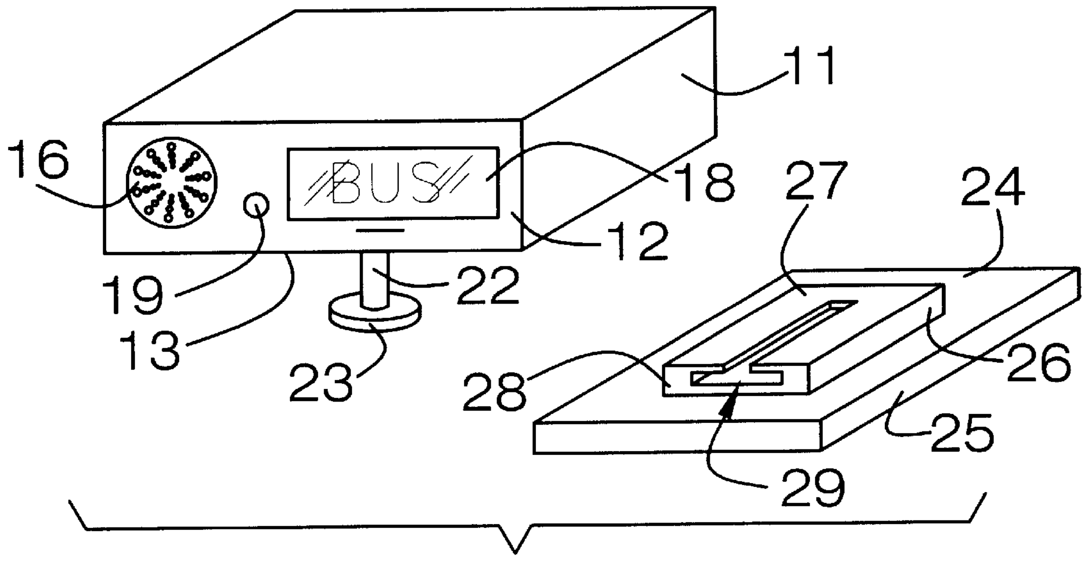
FIG. 5 is a perspective view of the transmitter assembly and transmitter mounting bracket of the present invention.

With reference now to the drawings, and in particular to FIGS. 1 through 5 thereof, a new school bus approaching notification system embodying the principles and concepts of the present invention and generally designated by the reference numeral 10 will be described.

As best illustrated in FIGS. 1 through 5, the school bus approaching notification system 10 generally comprises a transmitter assembly being adapted to be mounted in a school bus 41. The transmitter assembly includes a housing 11 having a bottom wall 13, and also includes a microprocessor 14 being conventionally disposed in the housing 11 and being conventionally connected to a power supply 15, and further includes a transmitter 16 being conventionally connected to the microprocessor 14, and also includes a bus warning light sensor 17 being conventionally connected to the microprocessor 14 for detecting a yellow warning light being emitted from the school bus 41, and further includes a display screen 18 being conventionally disposed in a front wall 12 of the housing 11, and also includes a power switch 19 being movably and conventionally disposed in the front wall 12 of the housing 11 for the energizing of the microprocessor 14. The transmitter 16 transmits a coded signals 20,21 including a first coded signal 20 identifying an approaching school bus 41, and also including a second coded signal 21 being actuated upon the emission of the yellow warning light on the school bus 41. The transmitter assembly further includes a support shaft 22 being conventionally attached to the bottom wall 13 of the housing 11, and also includes a disc-shaped support base 23 being conventionally attached to an end of the support shaft 22.

A transmitter mounting bracket 24 supports the housing 11 and is adapted to be securely fastened in the school bus 41. The transmitter mounting bracket 24 includes a base member 25; and also includes a retainer housing member 26 being conventionally attached to a topside of the base member 25 and having top and end walls 27,28 and also having an elongate inverted T-shaped slot 29 being disposed through the end wall 28 and extending along a length of the top wall 27 for receiving the disc-shaped support base 23.

A receiver assembly includes a first receiver unit 30 being adapted to be located in a home 42 and also includes a second receiver unit 31 being adapted to be located in a passenger vehicle 43. Each of the first and second receiver units 30,31 includes a housing member 32 having a front wall 33, and also includes a receiver 34 being conventionally disposed in the housing member 32, and further includes a microprocessor member 36 being conventionally connected to the receiver 34 and to a power source 37, and also includes a sound-producing member 38 such as a speaker unit being conventionally disposed in the front wall 33 of the housing member 32 and being conventionally connected to the microprocessor member 36 for audibly alerting a user of either an approaching school bus 41 or a stopping school bus 41, and further includes an antenna 35 being conventionally connected to the housing member 32 and to the receiver 34 for receiving a respective one of the coded signals 20,21 with the receiver 34 of the first receiver unit 30 capable of picking up the first coded signal 20 from approximately 300 feet away. Each of the first and second receiver units 30,31 also includes a display screen 39 being conventionally disposed in the front wall 33 of the housing member 32, and further includes an on/off switch 40 being movably and conventionally disposed in the front wall 33 of the housing member 32 for energizing the microprocessor unit 36.

In use, as the school bus 41 approaches a particular home 42, the first receiver unit 30 picks up the first coded signal 20 from the transmitter 14 and the sound-producing member 38 gives off an audible alerting message to the occupants of the home 42 to notify them of the approaching school bus 41, and as the school bus 41 begins to stop, the second receiver unit 31 picks up the second coded signal 21 from the transmitter 14 and alerts the driver of a nearby vehicle 43 that the school bus 41 is stopping.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the school bus approaching notification system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A school bus approaching notification system comprising:

a transmitter assembly being adapted to be mounted in a school bus, said transmitter assembly including a housing having a bottom wall, and also including a microprocessor being disposed in said housing and being connected to a power supply, and further including a transmitter being connected to said microprocessor, and also including a bus warning light sensor being connected to said microprocessor for detecting a yellow warning light being emitted from a school bus, and further including a display screen being disposed in a front wall of said housing, and also including a power switch being movably disposed in said front wall of said housing for the energizing of said microprocessor, said transmitter transmits coded signals including a first coded signal identifying an approaching school bus, and also including a second coded signal being actuated upon the emission of the yellow warning light on the school bus;

a transmitter mounting bracket supporting said transmitter assembly and being adapted to be securely fastened in the school bus; and a receiver assembly including a first receiver unit being adapted to located in a home and also including a second receiver unit being adapted to be located in a passenger vehicle.

2. A school bus approaching notification system as described in claim 1, wherein said transmitter assembly further includes a support shaft being attached to said bottom wall of said housing, and also includes a disc-shaped support base being attached to an end of said support shaft.

3. A school bus approaching notification system as described in claim 2, wherein said transmitter mounting bracket includes a base member; and also includes a retainer housing member being attached to a topside of said base member and having top and end walls and also having an elongate inverted T-shaped slot being disposed through said end wall and extending along a length of said top wall for receiving said disc-shaped support base.

4. A school bus approaching notification system as described in claim 3, wherein each of said first and second receiver units includes a housing member having a front wall, and also includes a receiver being disposed in said housing member, and further includes a microprocessor member being connected to said receiver and to a power source, and also includes a sound-producing member being disposed in said front wall of said housing member and being connected to said microprocessor member for audibly alerting a user of either an approaching school bus or a stopping school bus, and further includes an antenna being connected to said housing member and to said receiver for receiving a respective one of said coded signals, said receiver of said first receiver unit capable of picking up said first coded signal from approximately 300 feet away.

5. A school bus approaching notification system as described in claim 4, wherein each of said first and second receiver units also includes a display screen being disposed in said front wall of said housing member, and further includes an on/off switch being movably disposed in said front wall of said housing member for energizing said microprocessor unit.

* * * * *